United States Patent [19]
Bagshaw et al.

[11] 3,975,610
[45] Aug. 17, 1976

[54] WELDING
[75] Inventors: Trevor Bagshaw; John McCann, both of Sheffield, England
[73] Assignee: British Steel Corporation, London, England
[22] Filed: Sept. 9, 1974
[21] Appl. No.: 503,940

[30] Foreign Application Priority Data
Sept. 17, 1973 United Kingdom............... 43447/73

[52] U.S. Cl. ...................................... 219/76
[51] Int. Cl.² ...................................... B23K 9/04
[58] Field of Search ............................... 219/76

[56] References Cited
UNITED STATES PATENTS
3,549,410  12/1970  Farmer ................................ 219/76

Primary Examiner—J. V. Truhe
Assistant Examiner—David A. Tone
Attorney, Agent, or Firm—Bacon & Thomas

[57] ABSTRACT

Methods of hard facing iron or steel articles by a submerged arc welding process are described. Specifically, an iron or steel rolling mill roll arbor is hard faced by rotating the arbor about its longitudinal axis and traversing a welding head parallel to said axis to deposit a spiral bead of weld metal on the arbor for subsequent heat treatment and machining. Different consumable electrodes and fluxes are chosen to deposit a desired hard facing on the arbor.

3 Claims, 10 Drawing Figures

WELDING

This invention relates to a submerged arc welding process and particularly to the use of such process in the depositing of weld metal from a consumable electrode on to a former to provide a hard faced article such as, for example, a hard faced work roll or back up roll for use in a rolling mill for metals.

It is an object of the invention to provide new or improved methods of providing a hard faced article utilising submerged arc welding and it is also an object of the invention to provide a hard faced article produced by these methods.

In accordance with a first aspect of the invention there is provided a method of applying a hard facing to an iron or steel former comprising melting a consumable electrode and a flux on to the former by a submerged arc welding process and moving the former and the welding head relative to one another to deposit a bead of heat treatable low alloy steel weld metal on the former, the consumable electrode and the flux being chosen to give a said deposited weld metal comprising, by weight, from 0.15% to 0.30% carbon, up to 1.5% silicon, up to 2.5% manganese, from 3.0% to 7.0% chromium, up to 1.5% molybdenum, the balance being iron and impurities, the manganese and silicon being chosen in a ratio of approximately 2:1 and sufficient manganese being present to balance the sulphur content.

The impurities may comprise sulphur up to 0.04%, phosphorus up to 0.04% and nickel up to 0.5%.

In one preferred embodiment of this first aspect of the invention the weld metal may comprise 0.18% to 0.25% carbon, 0.6% to 1.0% silicon, 1.25% to 2.0% manganese, 4.0% to 6.0% chromium, 0.5% to 1.0% molybdenum, with the balance being iron and impurities to the maximum aforementioned.

In accordance with a second aspect of the invention there is provided a method of applying a hard facing to an iron or steel former comprising melting a consumable electrode and a flux on to the former by a submerged arc welding process and moving the former and the welding head relative to one another to deposit a bead of work-hardening austenitic stainless steel weld metal on the former, the consumable electrode and the flux being chosen to give a said deposited weld metal comprising, by weight, up to 0.2% carbon, up to 1.0% silicon, from 1.0% to 8.0% manganese, from 4.0% to 16.0% nickel, from 15.0% to 25.0% chromium, the balance being iron and impurities and the carbon/manganese/nickel/chromium ratios being chosen to achieve an optimum microstructure of not greater than 10% delta-ferrite in the interdendritic regions thereof.

The incidental impurities may comprise up to 0.04% sulphur and up to 0.04% phosphorus. In one preferred embodiment of this second aspect of the invention the weld metal may comprise up to 0.08% carbon, up to 0.5% silicon, from 5.0% to 7.0% manganese, from 7.0% to 9.0% nickel, from 16.0% to 18.5% chromium, the balance being iron and impurities to the maximum aforementioned.

In accordance with a third aspect of the invention there is provided a method of applying a hard facing to an iron or steel former comprising melting a consumable electrode and a flux on to the former by a submerged arc welding process and moving the former and the welding head relative to one another to deposit a bead of heat-treatable martensitic stainless steel weld metal on the former, the consumable electrode and the flux being chosen to give a said deposited weld metal comprising, by weight, from 0.10% to 0.25% carbon, up to 1.0% silicon, up to 2.0% manganese, from 1.5% to 3.0% nickel, from 10.0% to 15.0% chromium, from 0.5% to 2.0% molybdenum, from 0.1% to 0.5% vanadium, from 0.1% to 0.5% niobium, the balance being iron and impurities, and the nickel/chromium/molybdenum ratios being balanced to achieve an optimum microstructure of not greater than 10% delta-ferrite in the interdendritic regions thereof.

The impurities may comprise up to 0.04% sulphur, up to 0.04% phosphorus, and up to 0.06% nitrogen. In one preferred embodiment of this third aspect of the invention the weld metal may comprise from 0.10% to 0.15% carbon, up to 0.5% silicon, from 0.75% up to 1.25% manganese, from 2.0% to 2.5% nickel, from 10.0% to 12.0% chromium, from 1.0% to 1.5% molybdenum, from 0.1% to 0.2% vanadium, from 0.15% to 0.25% niobium, the balance being iron and impurities to the maximum aforementioned.

Also in accordance with the invention there is provided a hard faced article produced by a method in accordance with any of the three aspects of the invention aforementioned. In particular there is provided a hard faced work roll or back-up roll for a rolling mill produced by any one of the aforesaid methods.

The invention also provides a consumable electrode capable of use in a submerged arc welding process for depositing weld metal on an iron or steel former in accordance with any of the aforesaid three aspects of the invention.

Other features of the invention will become apparent from the following description given herein solely by way of example with reference to the accompanying drawings wherein.

The submerged arc welding process is utilised in accordance with the invention for producing hard faced articles comprising built-up layers of deposited weld metal on an iron or steel former. Specifically the invention contemplates a method of hard facing work rolls, or back up rolls, for use in a rolling mill for metals and comprises applying a continuous bead of weld metal from a welding head to a steel arbor. Typically the arbor may be supported at each of its ends in horizontal orientation, pre-heated from underneath and rotated slowly about its longitudinal axis, whilst a welding head to which is fed a consumable electrode and suitable flux, is traversed longitudinally of the arbor at its upper side.

The consumable electrode and the flux are melted on to the arbor by a submerged arc welding process to deposit a continuous bead of weld metal which will be built up in a substantially spiral fashion as the arbor is rotated and the welding head is traversed longitudinally thereof from end to end. After a sufficient quantity of weld metal has been deposited, the arbor is removed from its supporting assembly and the weld metal deposited thereon is heat treated and machined to provide an appropriate roll finish.

EXAMPLE I

In a first embodiment of the invention the deposited weld metal comprises a heat-treatable low alloy steel capable of achieving a wide range of hardness levels from 250 – 550 Hv by suitable adjustment of the tempering temperature. The consumable electrode is utilised in conjunction with a self releasing flux which is of the neutral or semi basic type to provide a weld metal comprising, by weight, from 0.18% to 0.25% carbon from 0.6% to 1.0% silicon, from 1.25% to 2.0% manganese, from 4.0% to 6.0% chromium, from 0.5% to 1.0% molybdenum, the balance being iron and impurities comprising up to 0.04% sulphur, up to 0.04% phosphorus, up to 0.5% nickel. Manganese and silicon are present in a ratio of 2:1 and sufficient manganese is present to balance the sulphur content.

The submerged arc welding process was carried out at 1050 Amps and 30 to 32 volts utilising respective preheat and interpass temperatures to the arbor of 300°C to 400°C, and 450°C maximum.

Figure 1:
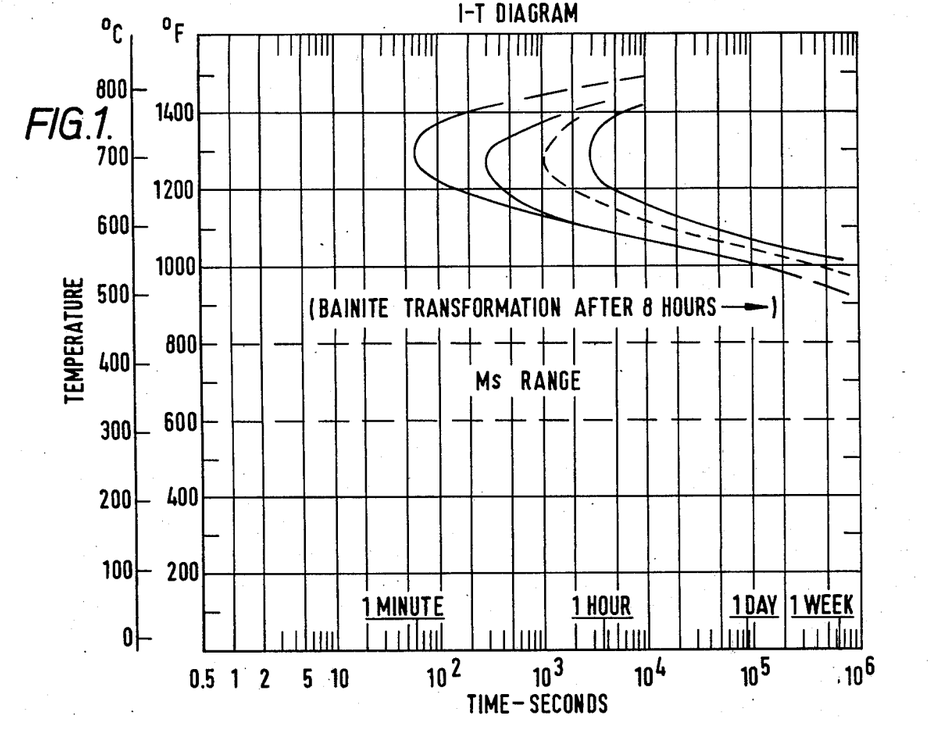
FIG. 1 is a diagram illustrating isothermal transformation data in respect of a first embodiment of the invention.
Figure 2:
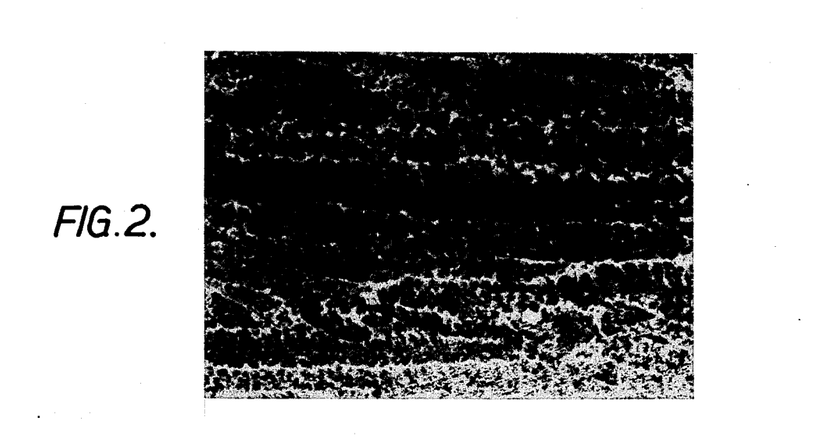
FIG. 2 is an illustration of the microstructure, to a magnification of 100 times, of weld metal deposited in accordance with a first embodiment of the invention.
Figure 3:
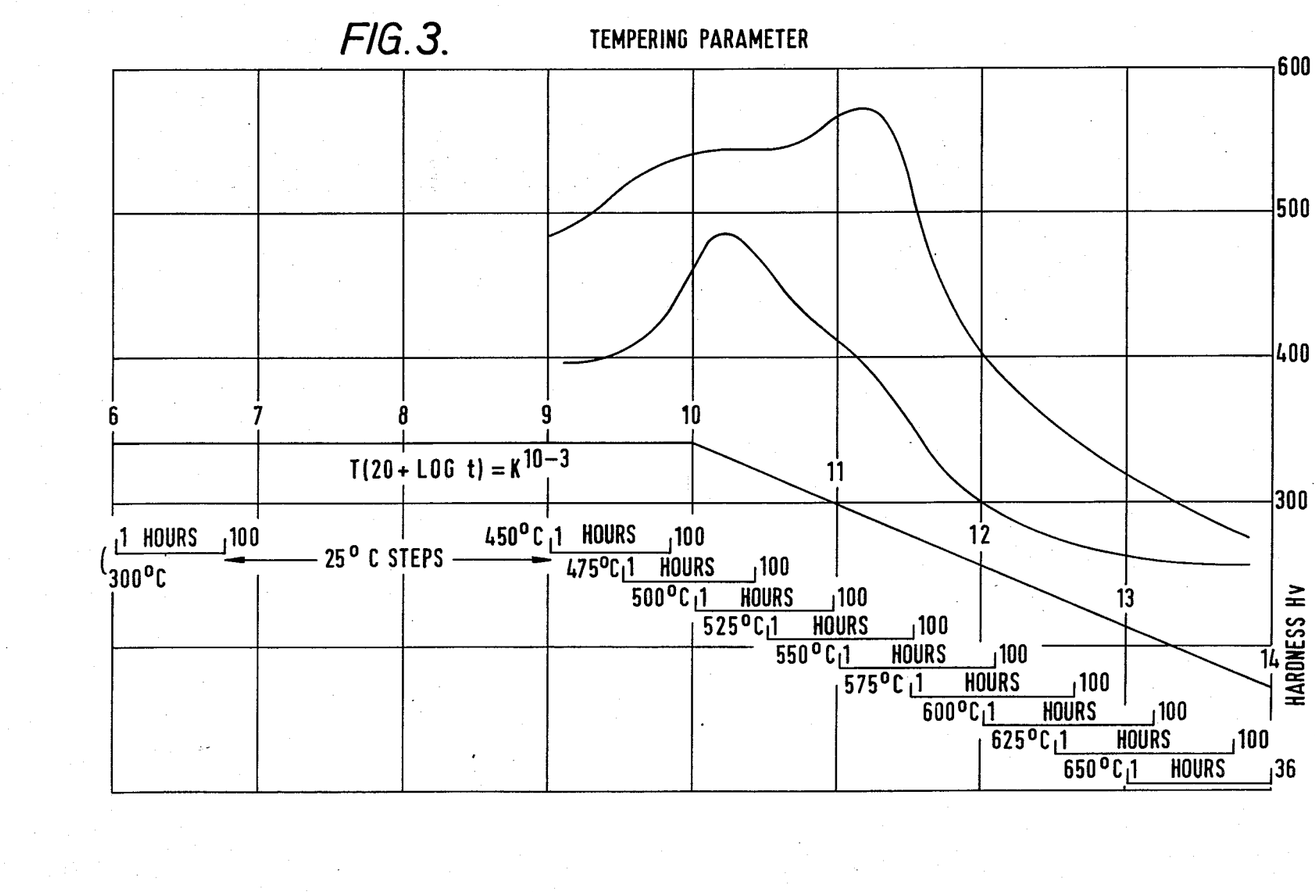
FIG. 3 is a diagram illustrating temper response data in respect of weld metal deposited in accordance with a first embodiment of the invention.

Referring to FIG. 1, the alloy was welded substantially in the "austenite bay" of the isothermal transformation diagram whilst suitable selection of heat input and interpass temperature ensured that the final microstructure was predominantly martensite/bainite as shown in FIG. 2. Such a selection provides a deposited weld metal which responds to further tempering as shown in FIG. 3 thus enabling a selection to be made of the hardness desired for each particular roll application.

Some typical heat treatment responses for such deposited weld metal are as follows:

| | |
|---|---|
| Tempered 24 hrs 500°C | Slow cooled - 450/500 Hv |
| Tempered 24 hrs 550°C | Slow cooled - 325/450 Hv |
| Tempered 24 hrs 575°C | Slow cooled - 280/320 Hv |
| Tempered 24 hrs 600°C | Slow cooled - 265/300 Hv |
| Tempered 24 hrs 650°C | Slow cooled - 250/275 Hv |

Figure 5:
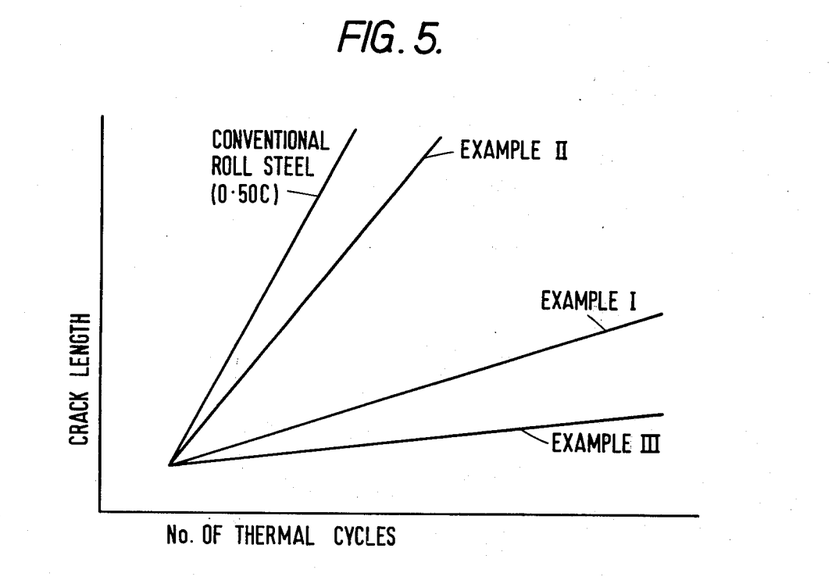
FIG. 5 is a diagram illustrating comparative thermal fatigue characteristics between weld metals deposited in accordance with the invention.
Figure 6:
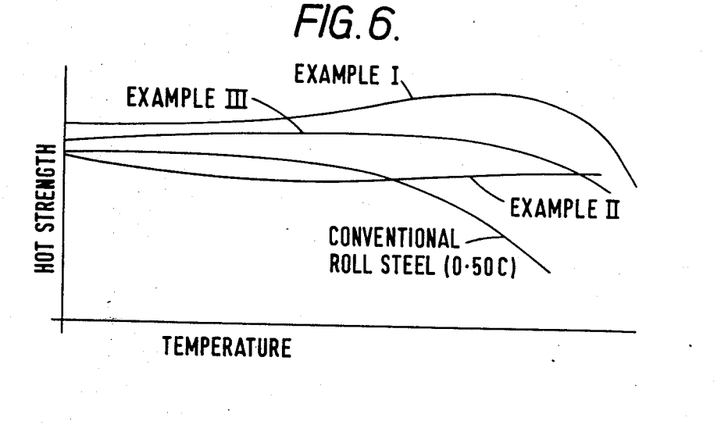
FIG. 6 is a diagram illustrating comparative hot hardness characteristics between weld metals deposited in accordance with the invention.

When heat treated to 300 to 320 Hv the deposited weld metal gave substantially better wear and thermal fatigue performance than conventional 0.5% carbon steel roll material (see FIGS. 4 and 5) due mainly to the uniformity of microstructure and the improved high temperature strength of the weld metal as compared to the 0.5% carbon steel roll material (See FIG. 6). Such characteristics provide a work roll for a rolling mill capable of withstanding hot mill usage.

EXAMPLE II

In a second embodiment of the invention a consumable electrode was melted on to a steel arbor by a submerged arc welding process utilising a self releasing flux of neutral or semi basic type. In this embodiment the weld metal deposited on the arbor is a work-hardening austenitic stainless steel, comprising, by weight, up to 0.08% carbon, up to 0.5% silicon, from 5.0% to 7.0% manganese, from 7.0% to 9.0% nickel, from 16.0% to 18.50% chromium, the balance being iron and impurities comprising up to 0.04% sulphur and up to 0.04% phosphorus. The carbon/manganese/nickel/chromium ratios are balanced to achieve an optimum microstructure of not greater than 10% delta-ferrite in the interdendritic regions thereof.

Figure 7:
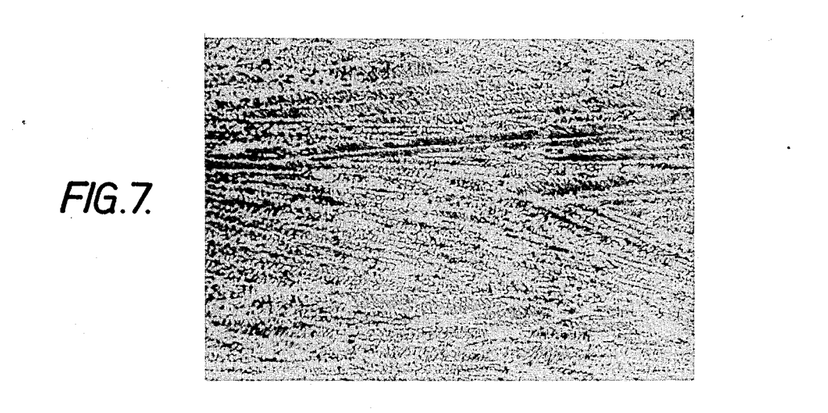
FIG. 7 is an illustration showing the microstructure, to a magnification of 100 times, of weld metal deposited in accordance with a second embodiment of the invention.

The weld metal was deposited over wide range of preheat and interpass temperatures and hardnesses were achieved of between 165/185 Hv. The improved wear and thermal fatigue properties when compared with the 0.5% carbon steel conventional roll material are clearly illustrated in FIGS. 4 to 6 of the drawings, whilst FIG. 7 illustrates the microstructure which is predominantly austenitic but contains up to 10% delta-ferrite distributed at the interdendritic regions. Weld metal deposited in accordance with this embodiment of the invention is especially suitable for use in the manufacture of work rolls for a mill concerned with primary ingot breakdown as it offers improved wear and thermal stability.

EXAMPLE III

In a third embodiment of the invention a consumable electrode was melted on to a steel arbor by a submerged arc welding process utilising a self releasing flux of neutral or semi basic type to yield a heat treatable martensitic stainless steel weld metal capable of achieving hardness in the range 300 – 330 Hv by appropriate selection of tempering temperature. The deposited weld metal comprised by weight from 0.10% to 0.15% carbon, up to 0.5% silicon, from 0.75% to 1.25% manganese, from 2.0% to 2.5% nickel, from 10.0% to 12.0% chromium, from 1.0% to 1.5% molybdenum, from 0.1% to 0.2% vanadium, from 0.15% to 0.25% niobium, the balance being iron and impurities comprising up to 0.04% sulphur, up to 0.04% phosphorus, and up to 0.06% nitrogen. The nickel/chromium/molybdenum ratios were balanced to achieve an optimum microstructure of not greater than 10% delta-ferrite in the interdendritic regions thereof.

Figure 8:
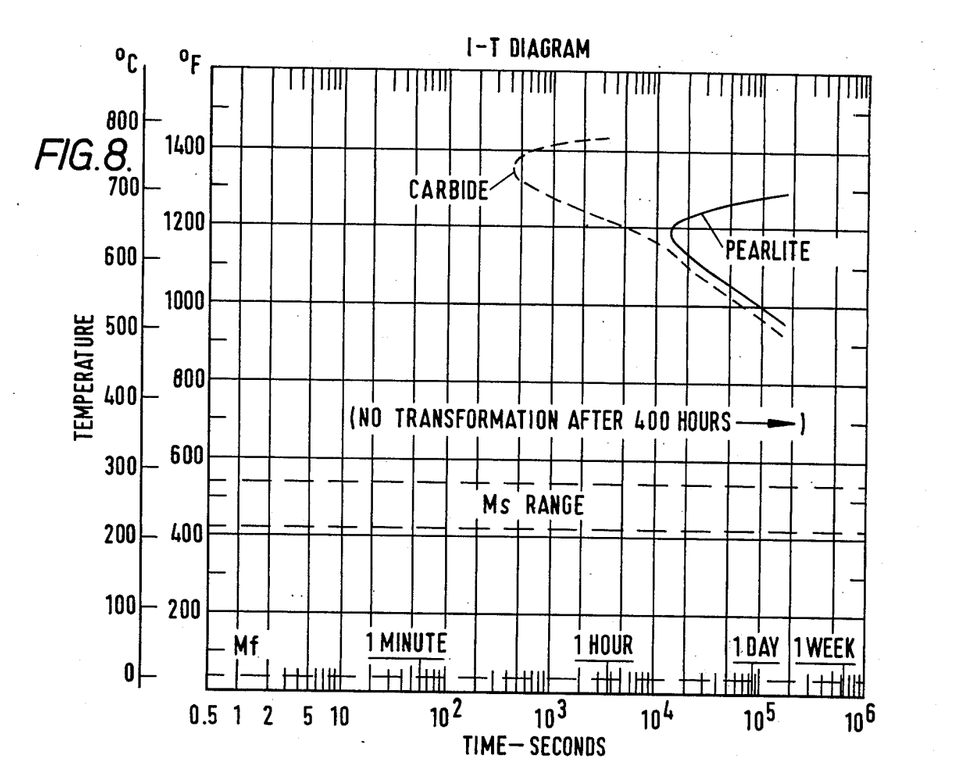
FIG. 8 is a diagram illustrating isothermal transformation data in respect of weld metal deposited in accordance with a third embodiment of the invention.
Figure 9:
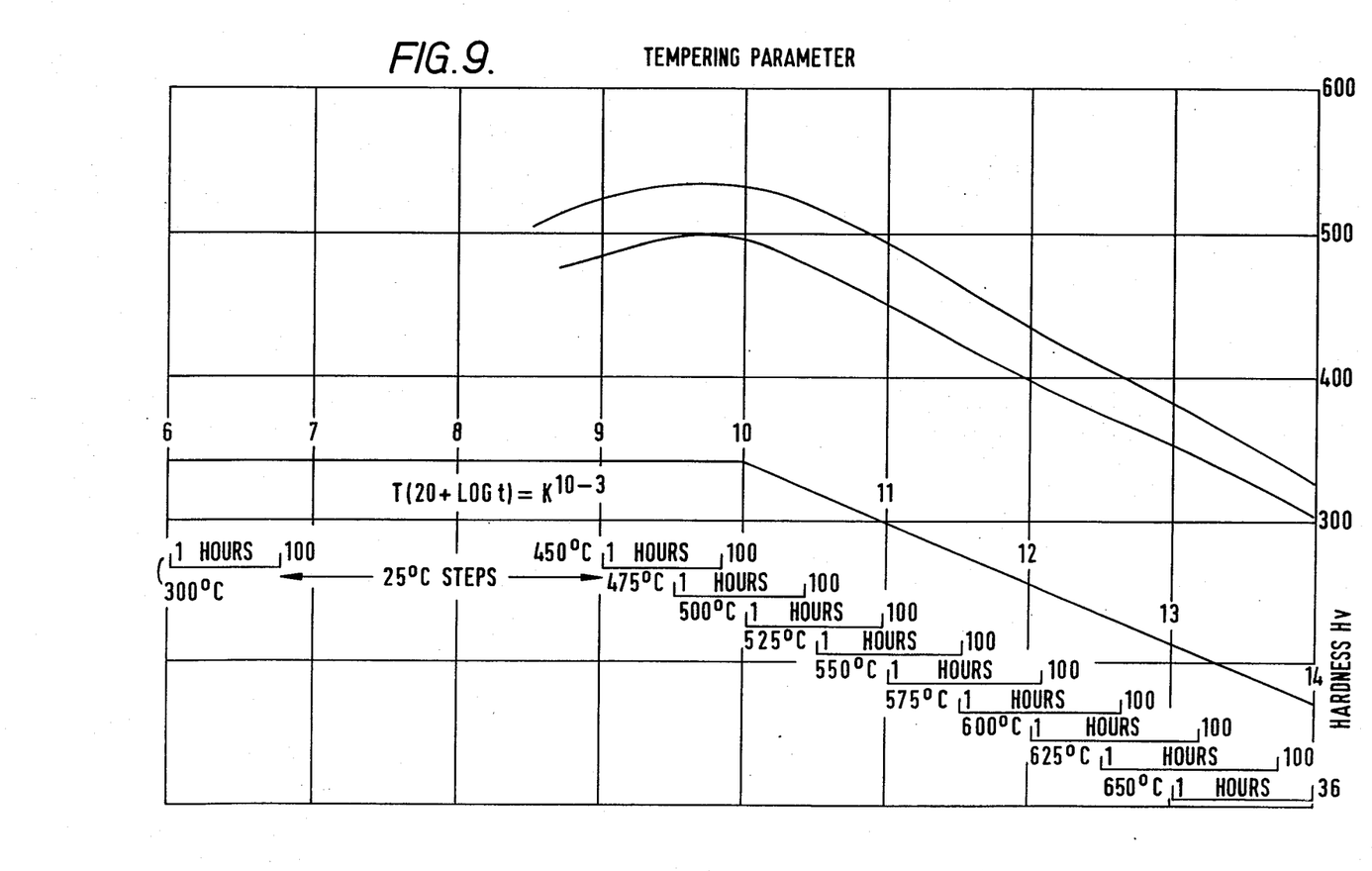
FIG. 9 is a diagram illustrating temper response data for weld metal deposited in accordance with a third embodiment of the invention.

The weld metal deposited in accordance with the third embodiment of the invention may be welded entirely within the austenite bay of the isothermal transformation diagram of FIG. 8 to ensure an extremely uniform microstructure and hardness after completion of welding and post-weld heat treatment. The metal was welded at 400 – 1250 Amps and 30 – 32 volts utilising respective pre-heat and interpass temperatures to the arbor of 300°C to 400°C and 450°C maximum and the built-up arbor was given and a post-weld heat treatment of 24 hours at 450°C to 650°C. The full temper response data of such weld metal is shown in FIG. 9 of the drawings and a typical set of tempering temperatures yielded the following results:

| 24 hrs at | 500°C | 470/510 Hv |
|---|---|---|
| | 550°C | 400/450 Hv |
| | 600°C | 350/400 Hv |
| | 650°C | 300/325 Hv |

Figure 4:
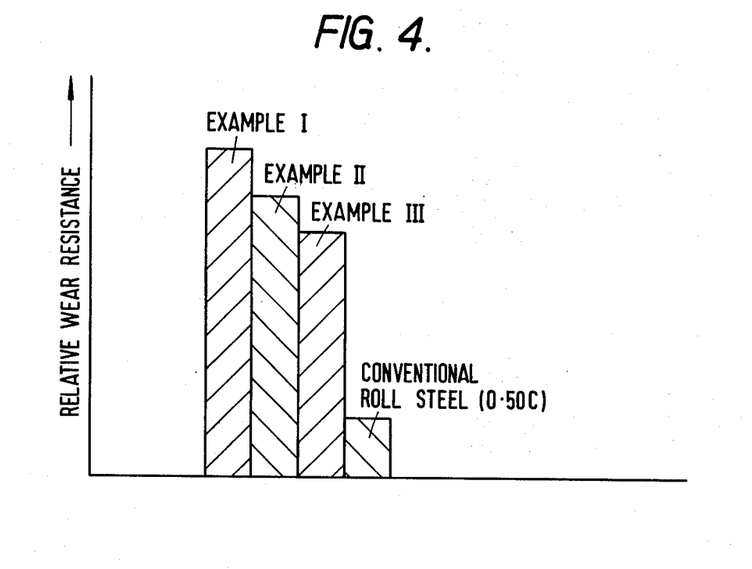
FIG. 4 is a diagram illustrating comparative wear resistance between different weld metals deposited in accordance with the invention.
Figure 10:
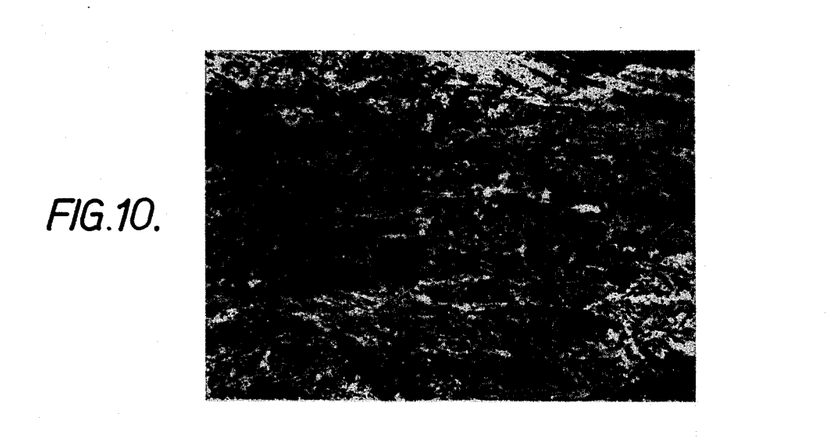
FIG. 10 is a drawing illustrating the microstructure, to a magnification of 100 times, of weld metal deposited in accordance with a third embodiment of the invention.

As will be seen from Fig. 10 the final microstructure contains less than 10% delta-ferrite distributed at the interdendritic regions, whilst the improved wear resistance and thermal fatigue properties when compared with the 0.5% carbon steel conventional roll material are illustrated in FIGS. 4 to 5. The particular improvement in thermal fatigue is reflected in the enhanced high temperature strength, as may be seen in FIG. 6, and also by the formation of an adherent oxide film during high temperature cycling roll manufactured in accordance with this embodiment of the invention may therefore be selected where a combination of uniformity of structure and hardness coupled with corrosion resistance is required for example in a hot strip mill roughing roll.

We claim:

1. A method of applying a hard facing to an iron or steel former comprising melting a consumable electrode and a flux on to the former by a submerged arc welding process and moving the former and the welding head relative to one another to deposit a bead of heat treatable low alloy steel weld on the former, the consumable electrode and the flux being chosen to give a said deposited weld metal comprising, by weight, from 0.18% to 0.25% carbon, 0.6% to 1.0% silicon, 1.25% to 2.0% manganese, from 4.0% to 6.0% chromium, 0.5% to 1.0% molybdenum, the balance being iron and impurities, the manganese and silicon being chosen in ratio of approximately 2 : 1 and sufficient manganese being present to balance the sulphur content.

2. A method of applying a hard facing to an iron or steel rolling mill roll arbor comprising melting a consumable electrode and a flux on to the arbor by a submerged arc welding process including the steps of supporting the arbor for rotation about its longitudinal axis and traversing the welding held relative to the arbor in a direction parallel to the said axis whilst the arbor is rotating to deposit a spiral bead of heat treatable low alloy steel weld metal on the arbor, the consumable electrode and the flux being chosen to give a said deposited weld metal comprising, by weight, from 0.18% to 0.25% carbon, 0.6% to 1.0% silicon, 1.25% to 2.0% manganese, 4.0% to 6.0% chromium, 0.5% to 1.0% molybdenum, the balance being iron and impurities, the manganese and silicon being chosen in a ratio of approximately 2 : 1 and sufficient manganese being present to balance the sulphur content.

3. A rolling mill roll comprising an iron or steel roll arbor having a hard facing of a heat treatable low alloy steel weld metal applied thereto by a submerged arc welding process, said weld metal comprising, by weight, from 0.18% to 0.25% carbon, 0.6% to 1.0% silicon, 1.25% to 2.0% manganese, from 4.0% to 6.0% chromium, 0.5% to 1.0% molybdenum, the balance being iron and impurities, the manganese and silicon being chosen in a ratio of approximately 2 : 1 and sufficient manganese being present to balance the sulphur content.

* * * * *